United States Patent [19]
Okamura

[11] Patent Number: 5,430,446
[45] Date of Patent: Jul. 4, 1995

[54] SEARCH AND RESCUE RADAR TRANSPONDER

[75] Inventor: Hiroshi Okamura, Hyogo, Japan

[73] Assignee: Mitsubishi Denki Kabushiki Kaisha, Tokyo, Japan

[21] Appl. No.: 257,905

[22] Filed: Jun. 13, 1994

[30] Foreign Application Priority Data

Jun. 30, 1993 [JP] Japan ................... 5-161741

[51] Int. Cl.6 ............................................. G01S 13/74
[52] U.S. Cl. ...................................................... 342/51
[58] Field of Search ..................... 342/51, 42, 44, 50

[56] References Cited

U.S. PATENT DOCUMENTS

| | | | |
|---|---|---|---|
| 4,107,675 | 8/1978 | Sellers et al. | 342/42 |
| 4,129,868 | 12/1978 | Tahara et al. | 342/51 |
| 4,673,936 | 6/1987 | Kotoh | 342/51 |
| 4,833,477 | 5/1989 | Tendler | 342/389 |
| 4,885,588 | 12/1989 | Kawakami | 342/51 |
| 4,980,689 | 12/1990 | Kawakami | 342/51 |
| 5,065,160 | 11/1991 | Kawakami | 342/51 |
| 5,153,836 | 10/1992 | Fraughton et al. | 364/461 |
| 5,235,337 | 8/1993 | Clark et al. | 342/51 |

*Primary Examiner*—John B. Sotomayor
*Attorney, Agent, or Firm*—Rothwell, Figg, Ernst & Kurz

[57] ABSTRACT

The present invention provides a search and rescue radar transponder easy in maintenance and checking. In the search and rescue radar transponder of the invention, the transmission electric power of the transmitting circuit 3 leaked at the changeover switch 7 is inputted to the receiving circuit 2, and whether the search and rescue radar transponder operates normally or not is judged by comparing the leaked electric power level detected by the receiving circuit 2 with a prescribed level at the controlling circuit 4. Hereby, the operation-checking of the search and rescue radar transponder proper other than an antenna can be executed by a built-in apparatus, and its maintenance and checking can be executed easily and rapidly.

5 Claims, 12 Drawing Sheets

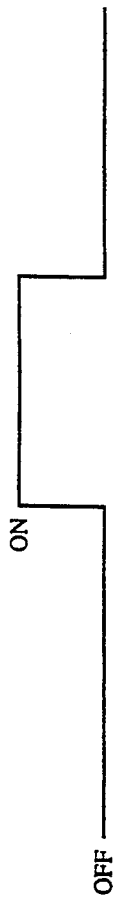
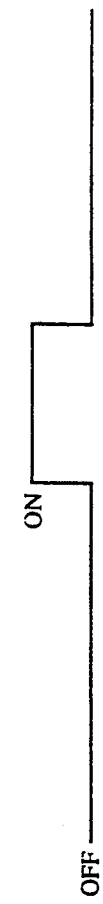
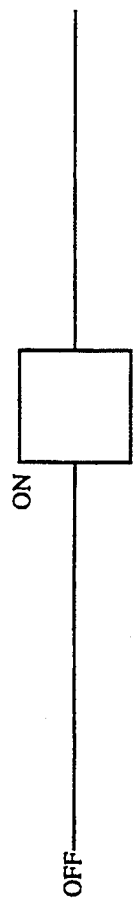
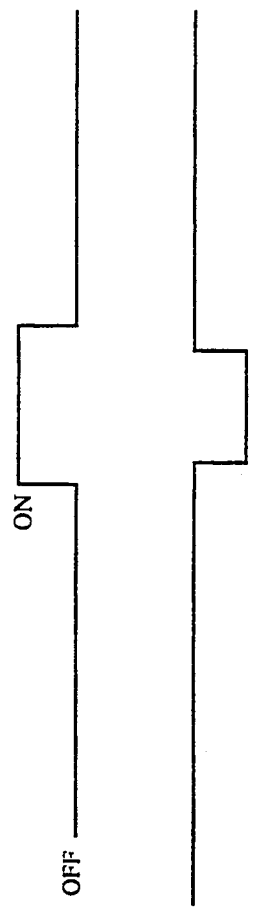
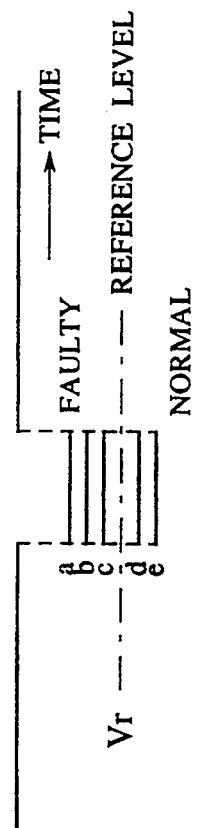
FIG. 6A OPERATION-CHECKING SIGNAL (TO CONTROLLING CIRCUIT)
FIG. 6B TRANSMISSION · ON" TIME (TO TRANSMITTING CIRCUIT)
FIG. 6C TRANSMISSION SIGNAL (FROM TRANSMITTING CIRCUIT)
FIG. 6D RECEIVER · ON" TIME (TO RECEIVING CIRCUIT)
FIG. 6E AMPLIFIED AND DETECTED SIGNAL (TO CONTROLLING CIRCUIT)
FIG. 6F OPERATION-JUDGING SIGNAL $V_s$ (CONTROLLING CIRCUIT)

SEARCH AND RESCUE RADAR TRANSPONDER

BACKGROUND OF THE INVENTION

1. Field of the Invention

This invention relates to a search and rescue radar transponder (hereinafter referred to as "SART" in short) to receive transmitted signals from rescue radars (hereinafter referred to as "radars" in short) and to transmit rescue signals for informing the radars of its location.

2. Description of the Prior Art

FIG. 1 is a block diagram showing a structure of a prior art SART. In FIG. 1, reference numeral 1a designates an antenna for receiving radar signals (hereinafter referred to as "receiving antenna"); numeral 1b designates an antenna for transmitting rescue signals (hereinafter referred to as "transmitting antenna"); numeral 2 designates a receiving circuit to amplify and detect the radar signals received by the receiving antenna 1a; numeral 3 designates a transmitting circuit to generate rescue signals and output them to the transmitting antenna 1b; numeral 4 designates a controlling circuit to control the operation of the transmitting circuit 3 and the receiving circuit 2; numeral 5 designates an operating switch for operating this SART; and numeral 6 designates a power source to supply electric power to the receiving circuit 2, the transmitting circuit 3 and the controlling circuit 4.

FIG. 2 is a block diagram showing a structure of another prior art SART having an antenna for transmitting and receiving, which is commonly used as the transmitting antenna 1b and the receiving antenna 1a of FIG. 1. In FIG. 2, reference numeral 1 designates that antenna; and numeral 7 designates a changeover switch to change over the connection of the transmitting circuit 3 and the receiving circuit 2 to the antenna 1.

Next, the operation of the prior art SART will be described. SARTs operate in order to display their own locations on radar faceplates by receiving transmitted signals from the radars and transmitting specified rescue electric waves within receivable periods of the radars at the time of disasters. For this reason, the SARTs are begun to be used in large quantities as effective equipment, being all-weather and 24 hour type lifesaving appliances which are not influenced by the weather and time zones, for saving lives precisely and quickly.

Since the SARTs shown in FIG. 1 and FIG. 2 differ only in the point of using the antenna 1 in common or not, the description of their operation on the basis of the timing chart of FIG. 3 will be done only about that of the SART shown in FIG. 2, and the description of the operation of the SART shown in FIG. 1 will be omitted.

Although the SART is in its nonoperating state usually, electric power is supplied to the receiving circuit 2, the transmitting circuit 3 and the controlling circuit 4 from the power source 6 when a sufferer turns the operating switch 5 on at the time of his or her disaster. The controlling circuit 4 brings the receiving circuit 2 on its operating state (FIG. 3C) at first, and it changes over the changeover switch 7 to the contact "a" of the side of the receiving circuit 2 at the same time. In this state, if transmission signals from a radar are sent (FIG. 3A), these electric waves are received by the antenna 1 of the SART after some time delays in proportion to the distance between the radar and the SART (FIG. 3B). The transmission signals received by the antenna 1 are amplified and detected at the receiving circuit 2, then they are inputted to the controlling circuit 4. In the case where the signal levels of the inputted signals from the receiving circuit 2 are at a prescribed level or more, the controlling circuit 4 changes over the changeover switch 7 to the contact "b" of the side of the transmitting circuit 3 for generating rescue signals, and it outputs transmission-beginning signals to the transmitting circuit 3 at the same time (FIG. 3E). Then the controlling circuit 4 causes the transmitting circuit 3 to generate rescue signals to be sent to the air from the antenna 1 (FIG. 3D) so as to be received by radars.

Besides, the controlling circuit 4 controls the operation timing to stop the operation of the transmitting circuit 3 during the time of receiving operation of the SART and to stop the operation of the receiving circuit 2 during the time of transmitting operation of the SART in order to prevent misoperation by interference in transmitting and receiving operation of the SART (FIG. 3C), FIG. 3E).

Moreover, there are Published Unexamined Patent Applications to Japan No. 152886 of 1979 and No. 186184 of 1992 as documents describing preceding techniques related to the above mentioned prior art.

Since the prior art SARTs are constructed as mentioned above, the SARTs are left as they are in their nonoperating states for many hours normally, as the chance of meeting a disaster is rare in spite of being made so as to operate at the time of the disaster. Consequently, it is resulted whether the SARTs operate well or not at the time of a disaster is entrusted to the reliability of the SARTs proper and their preserved conditions. Moreover, the power sources used in the SARTs are generally primary batteries, so their terms of preservation are limited and the spans of their lives vary according to their preserved states. For that reason, it is necessary to check the operation of the SARTs periodically, but to check the SARTs proper by removing them from their installed places (such as vessels, lifeboats and the like) has such problems that it is elaborate and the inspecting apparatus for it also are large-scale and expensive.

SUMMARY OF THE INVENTION

In view of the foregoing, it is an object of the present invention to provide a SART in which it can be ascertained easily and rapidly without radar signals whether the operation of it is normal or not at the time other than disasters.

It is another object of the present invention to provide a SART which can be checked at signal levels near to its actual operation levels by decreasing input signal levels to its receiving circuit in the case where leakage electric power from its changeover switch to the receiving circuit is large.

It is a further object of the present invention to provide a SART in which transmission signals are not radiated to the outside at the time of its operation-checking.

According to the first aspect of the present invention, for achieving the above-mentioned objects, there is provided a SART comprising an operation-checking switch changing over the operation of the SART to its checking operation; and a checking function circuit outputting a timing signal to generate a rescue signal to its transmitting circuit when the operation-checking switch is turned on, the checking function circuit outputting a changeover signal to change over a changeover switch to the side of the transmitting circuit, the checking function circuit outputting another timing signal to amplify and to detect the leakage electric power of a transmission signal from the transmitting circuit which leaked at the changeover switch, the checking function circuit outputting an indicating signal to judge the propriety of the operation of the SART by comparing the output signal level of a receiving circuit with a prescribed reference level.

As stated above, the SART according to the first aspect of the present invention makes the transmitting circuit generate the transmission signal, and it makes the receiving circuit receive the transmission electric power of the transmission signal having leaked at the changeover switch at the same time, then it judges the propriety of its operation by comparing the received signal level with the reference level. Consequently, the SART can check its operation without receiving radar signals and it can ascertain easily and rapidly whether its operation is normal or not at the time other than disasters.

According to the second aspect of the present invention, there is provided a SART provided with a second changeover switch, installed between a first changeover switch and a receiving circuit, which changes over the connection of the inputting terminal of the receiving circuit between the side of the first changeover switch and the side of a non-reflecting terminating device; and a checking function circuit outputting a changeover signal to the second changeover switch when an operation-checking switch is turned on, the changeover signal changing over the second changeover switch to the non-reflecting terminating device.

As stated above, the SART according to the second aspect of the present invention inputs the leakage electric power having leaked at the second changeover switch in the leakage electric power at the first changeover switch changing over an antenna. Consequently, the SART can be checked at signal levels near to its actual operating levels by decreasing input signal levels to the receiving circuit in the case where leakage electric power from the first changeover switch to the receiving circuit is large.

According to the third aspect of the present invention, there is provided a SART provided with a coupler connected between a first changeover switch and a transmitting circuit to supply a part of the transmission electric power of the transmitting circuit to a receiving circuit, a second changeover switch connected to the coupler's receiving circuit side output terminal, and a checking function circuit outputting a changeover signal to the first and the second changeover switches when an operation-checking switch is turned on, the changeover signal changing over the first and the second changeover switches to the receiving circuit side and the coupler side respectively.

As stated above, the SART according to the third aspect of the present invention inputs a part of the transmission electric power to the receiving circuit through the coupler, and it changes over the first changeover switch to the side of the receiving circuit, and further it does not connect the second changeover switch to the side of the receiving circuit. Consequently, transmission signals are not radiated to the outside at the time of the operation-checking of the SART.

According to the fourth aspect of the present invention, there is provided a SART provided with a second changeover switch connected between a first changeover switch and a receiving circuit to change over the connection of an input terminal of the receiving circuit between the side of the first changeover switch and the side of a transmitting circuit; a third changeover switch connected between the first changeover switch and the transmitting circuit to change over the connection of the output terminal of the transmitting circuit between the side of the first changeover switch and the side of the receiving circuit; and a checking function circuit outputting a changeover signal to the first changeover switch, the changeover signal changing over the first changeover switch to the receiving circuit side, the checking function circuit outputting another changeover signal to the second changeover switch, the changeover signal changing over the second changeover switch to the transmitting circuit side, the checking function circuit outputting another changeover signal to the third changeover switch, the changeover signal changing over the third changeover switch to the receiving circuit side, when an operation-checking switch is turned on.

As stated above, in the SART according to the fourth aspect of the present invention, the third changeover switch changing over the output of the transmitting circuit is changed over to the receiving circuit side, and the receiving circuit side also is apart from the antenna of the SART by the second changeover switch. Consequently, transmission signals are not radiated to the outside at the time of operation-checking of the SART.

According to the fifth aspect of the present invention, there is provided a SART provided with a coupler connected between a second changeover switch and a third changeover switch to supply a part of the transmission electric power of a transmitting circuit to a receiving circuit and to supply the remaining transmission electric power to a non-reflecting terminating device.

As stated above, in the SART according to the fifth aspect of the present invention, the non-reflecting terminating device absorbs the transmission electric power. Consequently, transmission signals are not radiated to the outside.

The above and further objects and novel features of the invention will more fully appear from the following detailed description when the same is read in connection with the accompanying drawing. It is to be expressly-understood, however, that the drawings are for purpose of illustration only and are not intended as a definition of the limits of the invention.

BRIEF DESCRIPTION OF THE DRAWINGS

FIG. 6A, FIG. 6B, FIG. 6C, FIG. 6D, FIG. 6E and FIG. 6F are timing charts showing the operation of the embodiment;

DETAILED DESCRIPTION OF THE PREFERRED EMBODIMENTS

Preferred embodiments of the present invention will now be described in detail on reference to the accompanying drawings.

EMBODIMENT 1

Figure 1:
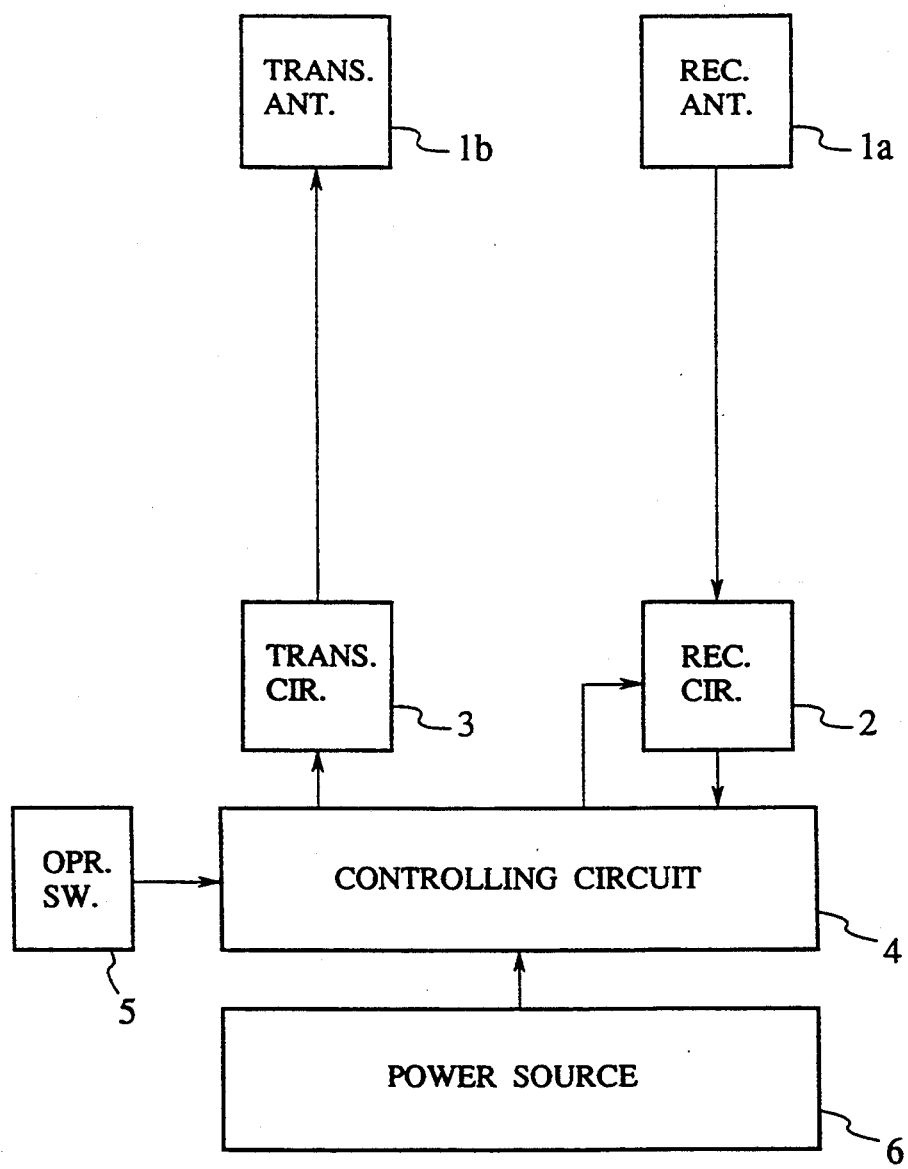
FIG. 1 is a block diagram showing a structure of a prior art SART.
Figure 2:
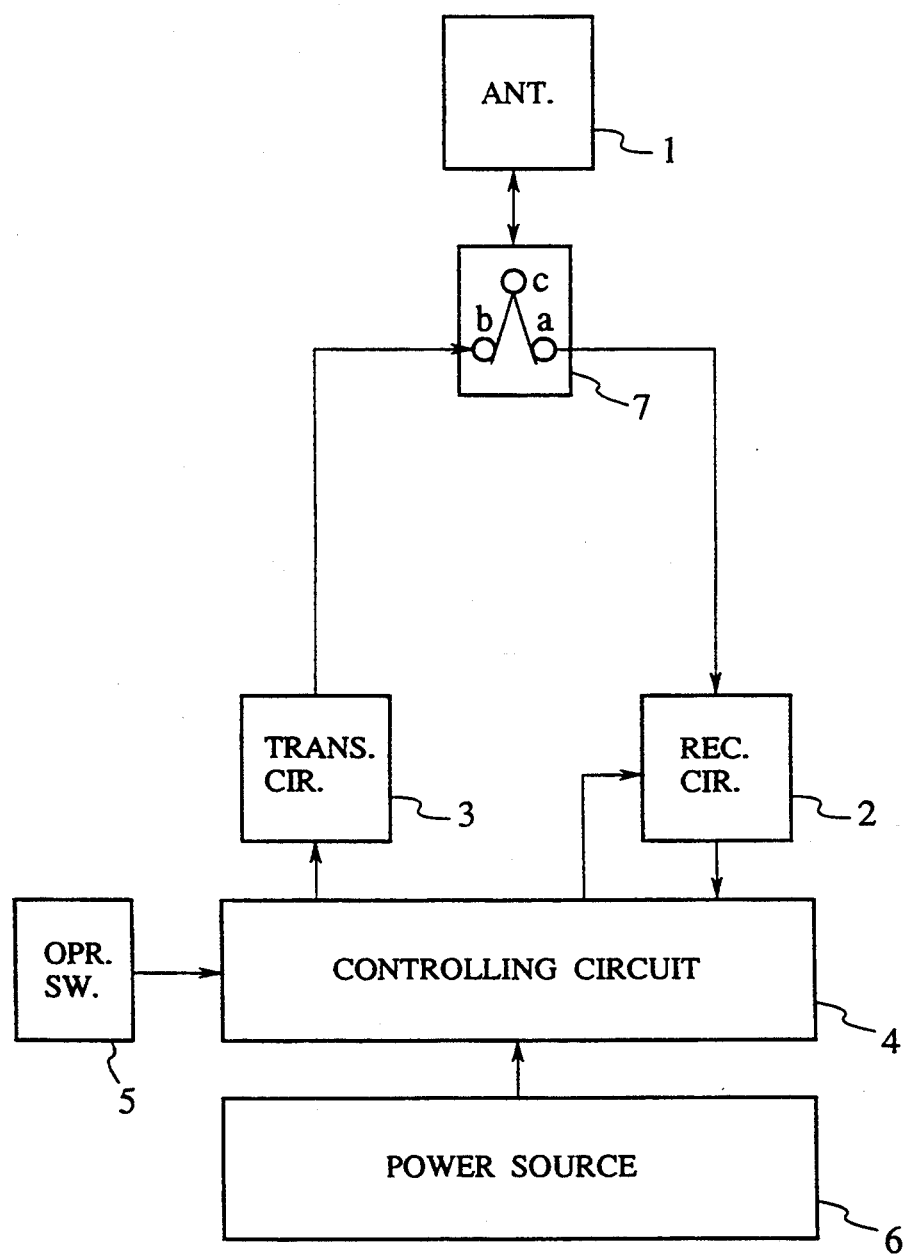
FIG. 2 is a block diagram showing another structure of another prior art SART.
Figure 3:
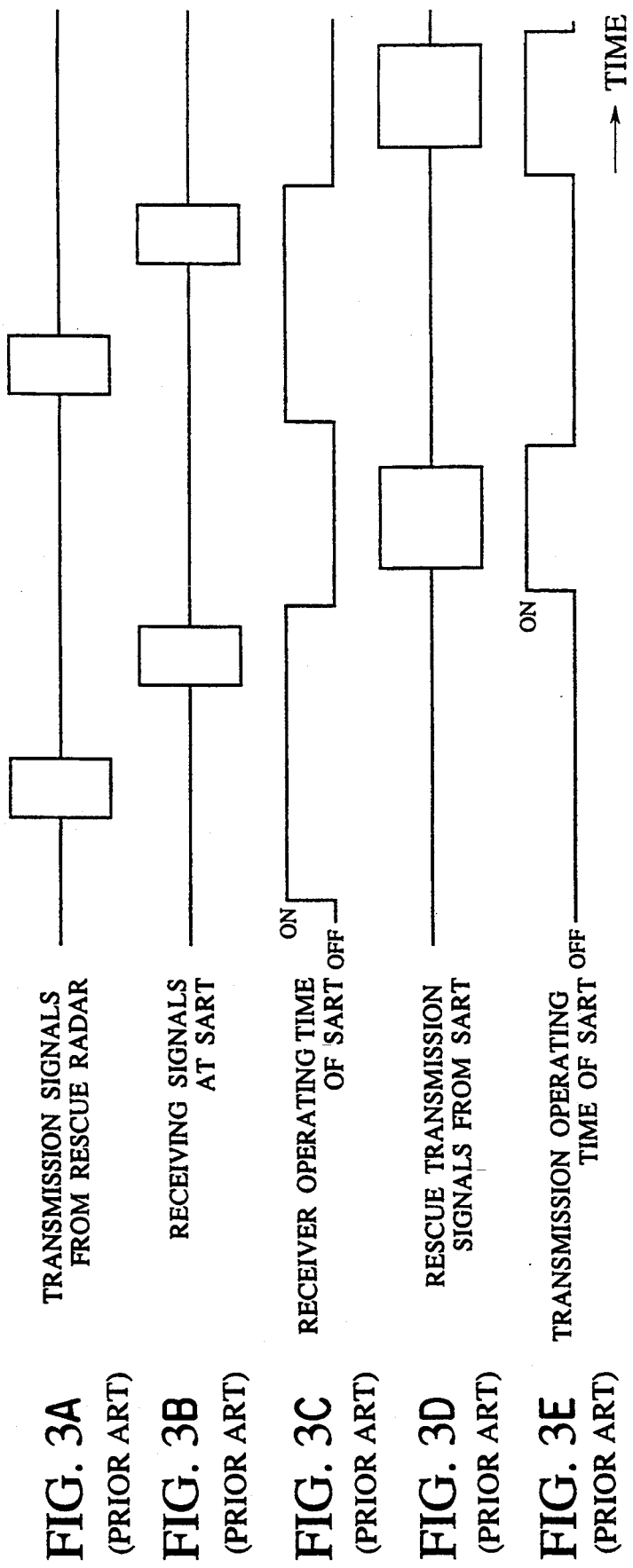
FIG. 3A, FIG. 3B, FIG. 3C, FIG. 3D and FIG. 3E are timing charts showing the operation of the prior art SART of FIG. 2.
Figure 4:
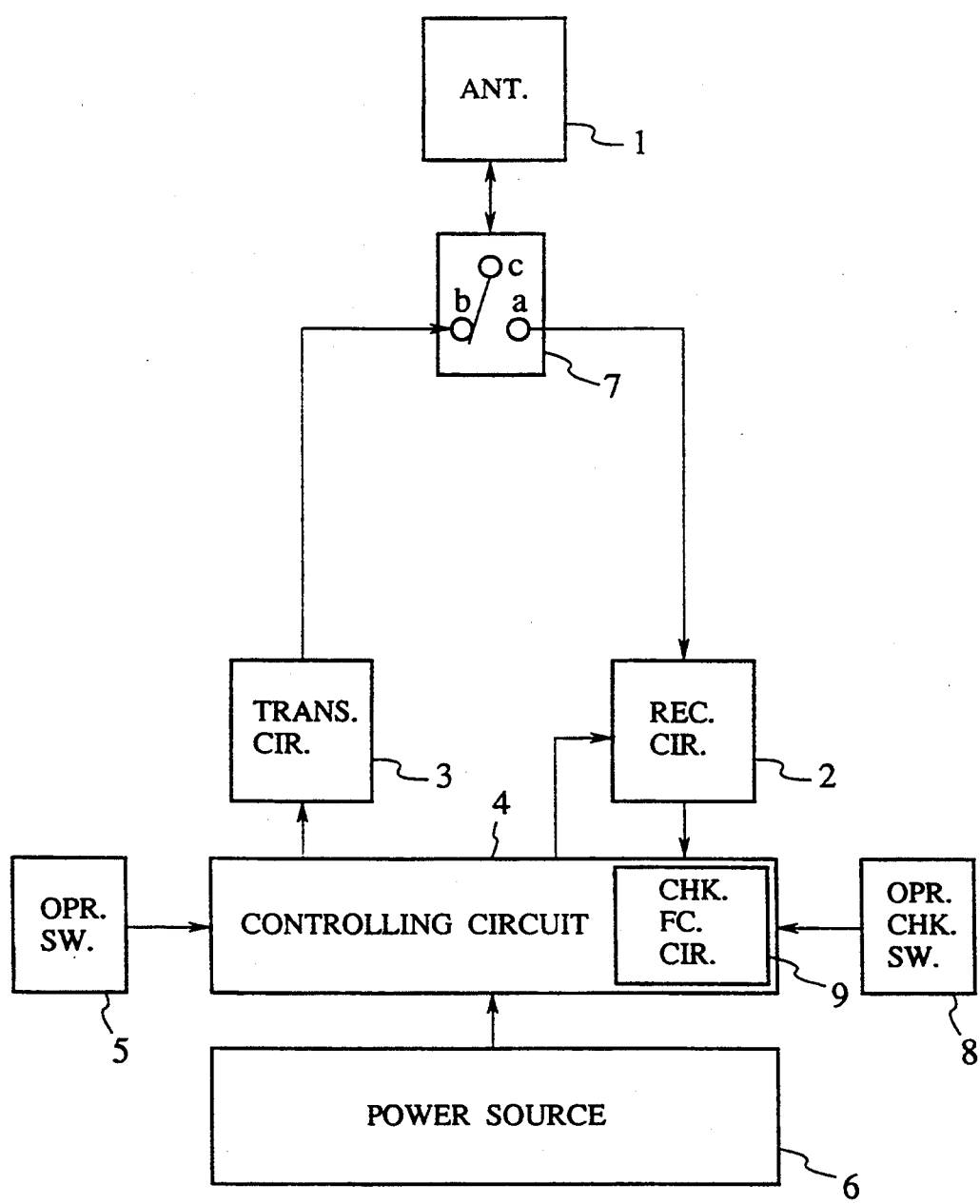
FIG. 4 is a block diagram showing the structure of the embodiment 1 of the SART of the present invention.

In FIG. 4, reference numeral 1 designates an antenna used as both transmitting one and receiving one; numeral 2 designates a receiving circuit to amplify and detect radar signals received by the antenna 1; numeral 3 designates a transmitting circuit generating rescue signals to output the antenna 1; numeral 4 designates a controlling circuit controlling the operation of the transmitting circuit 3 and the receiving circuit 2; numeral 5 designates an operating switch for operating this SART; numeral 6 designates a power source supplying electric power to the receiving circuit 2, the transmitting circuit 3 and the controlling circuit 4; numeral 7 designates a changeover switch changing over the connection of the transmitting circuit 3 and the receiving circuit 2 to the antenna 1; numeral 8 designates an operation-checking switch changing over the operation of the SART to the operation for checking; and numeral 9 designates a checking function circuit in the controlling circuit 4, the checking function circuit outputting a timing signal to the transmitting circuit 3, the timing signal to generate the rescue signals, the checking function circuit outputting a changeover signal to the changeover switch 7, the changeover signal to change over the changeover switch 7 to the side of the transmitting circuit 3, the checking function circuit outputting another timing signal to the receiving circuit 2, the timing signal to amplify and detect the leakage electric power of a transmission signal from the transmitting circuit 3 having leaked at the changeover switch 7, the checking function circuit outputting an indicating signal to the controlling circuit 4, the indicating signal to judge the propriety of the SART's operation by comparing the output signal levels of the receiving circuit 2 to a prescribed reference level. As a scale of the checking function circuit 9 is so small, it can be built in the controlling circuit 4.

Figure 5:
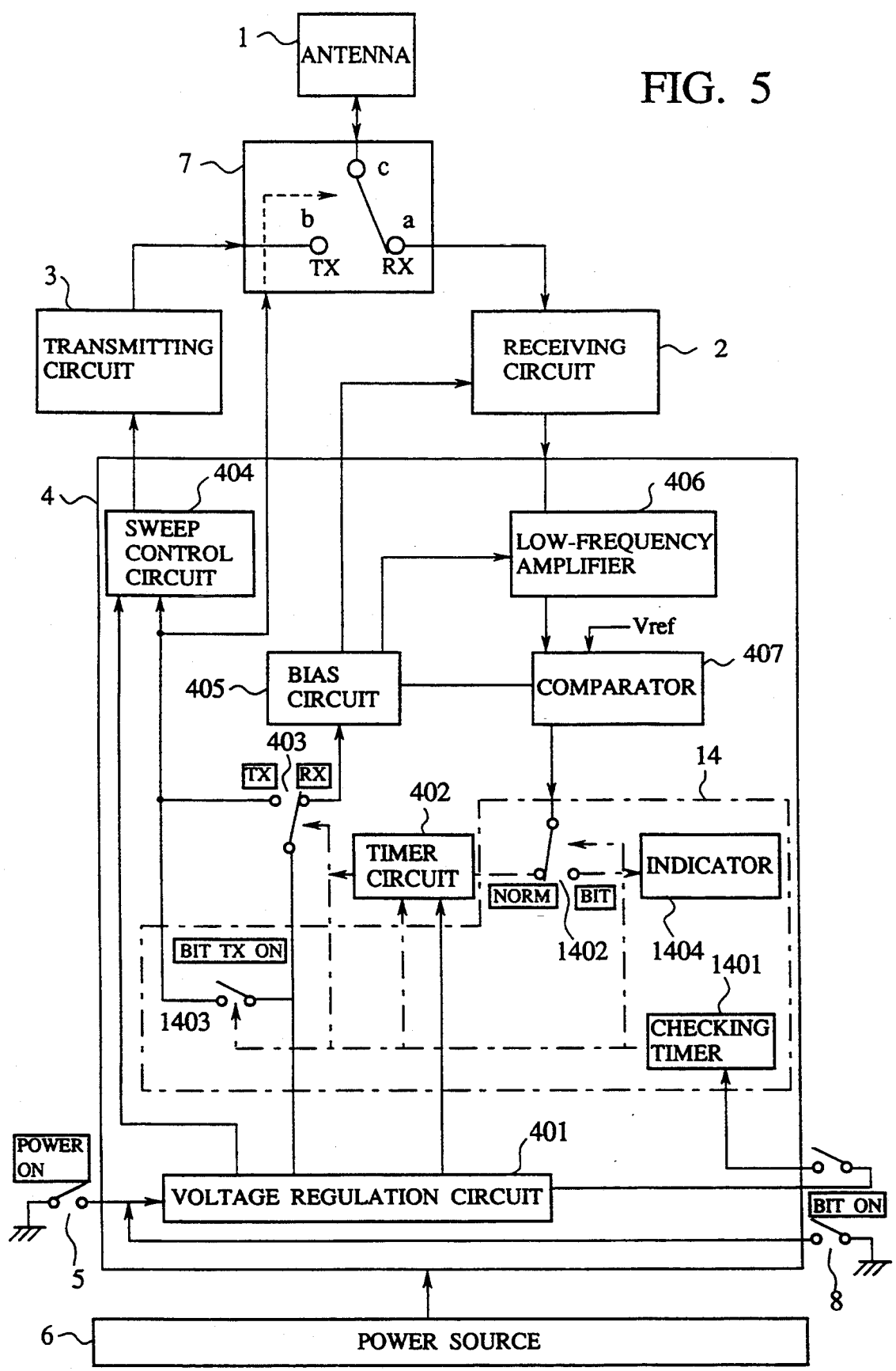
FIG. 5 is a block diagram showing a detailed structure of the embodiment 1 of the SART of the present invention.

FIG. 5 shows an internal structure of the SART.

Next, the operation of this embodiment will be described. At first, in the operating state used by a sufferer at the time of a disaster, when the sufferer turns the operating switch 5 on, electric power is supplied to the receiving circuit 2, the transmitting circuit 3 and the controlling circuit 4 from the power source 6. The controlling circuit 4 brings the receiving circuit 2 on its operating state, and the controlling circuit 4 changes over the changeover switch 7 to the contact "a" of the side of the receiving circuit 2 at the same time. At this time, if transmission signals from a radar are sent, these electric waves are received by the antenna 1 of the SART after some time delays in proportion to the distance between the radar and the SART. The transmission signals received by the antenna 1 are amplified and detected at the receiving circuit 2, then they are inputted to the controlling circuit 4. In the case where the signal levels of the inputted signals from the receiving circuit 2 are at a prescribed level or more, the controlling circuit 4 changes over the changeover switch 7 to the contact "b" of the side of the transmitting circuit 3 for generating rescue signals, and it outputs transmission-beginning signals to the transmitting circuit 3 at the same time. Then the rescue signals generated at the transmitting circuit 3 are sent to the air from the antenna 1 so as to be received by radars.

Next, the operation at the time of checking will be described on reference to a block diagram of FIG. 5 and a timing chart of FIG. 6. When the operation-checking switch 8 is turned on, the voltage regulation circuit 401 is waked up and the power from the circuit 401 is provided for the checking function circuit 9. That is, the function checking signal shown in FIG. 6A indicates a power provided period from the voltage regulation circuit 401.

The checking timer 1401 outputs on-signal which is active on a period of checking, for example one second, from start timing of power supply. An output signal of the checking timer 1401 makes the timer 402 for realizing repeats of transmitting and receiving stop, makes the switch 1403 for actuating the sweep control circuit 404 turn on and makes the switch 403 turn on to RX side. As a result, the transmitting circuit 3 is provided with sweep signals (see FIG. 6B). In addition, a connection between contact "b" and contact "c" in switch 7 is achieved. Further, the bias circuit 405 for actuating the receiving circuit 2, the low-frequency amplifier 406 and the comparator 407 is waked up.

As the output signal of the checking timer 1401 also the switch 1403 turn on to BIT, the output of the comparator 407 is connected to the indicator 1404. As mentioned above, both the transmitting circuit 3 and the receiving circuit 2 are under the condition of actuation (see FIGS. 6B and 6D).

A transmission signal generated by the transmitting circuit 3 is provided for the antenna 1 through "b" and "c" contacts of the switch 7. Leaked electric power exists between contacts "b" and "a" on the basis of incompleteness of isolation. The leaked power is under about 1:1000 of the transmitting power. The receiving circuit 2 receives, amplifies and detects the leaked electric power of the transmission signal and the receiving circuit 2 outputs the leaked electric power to the controlling circuit 4 (FIG. 6E. Since the indicating signal to judge the propriety of the SART's operation by comparing the output signal levels of the receiving circuit 2 to the prescribed reference level has been inputted to the controlling circuit 4 from the checking function circuit 9, the controlling circuit 4 judges whether the detection level of the reception signal Vs of the receiving circuit 2 is larger than the reference level Vr or not (for example, if the reception signal Vs has a signal level Vu being larger than the reference level Vr, the SART is normal; and if the reference signal Vs has a signal level V1 being smaller than the reference level Vr, the SART is abnormal) (FIG. 6F), then the indicator 1404 displays the result on the displaying apparatus not shown.

Since the operation-checking in this embodiment is executed by operating every component of the SART other than the antenna 1, the characteristic inferiority of every component other than the antenna 1, the deterioration of the power source and the like can be judged. Moreover, the time required to the operation-checking is momentary, and the operation-checking switch 8 will be set to turn off after a short fixed time. Accordingly, the consumption of the power source 6 accompanied by the checking operation is almost negligible.

EMBODIMENT 2

Figure 7:
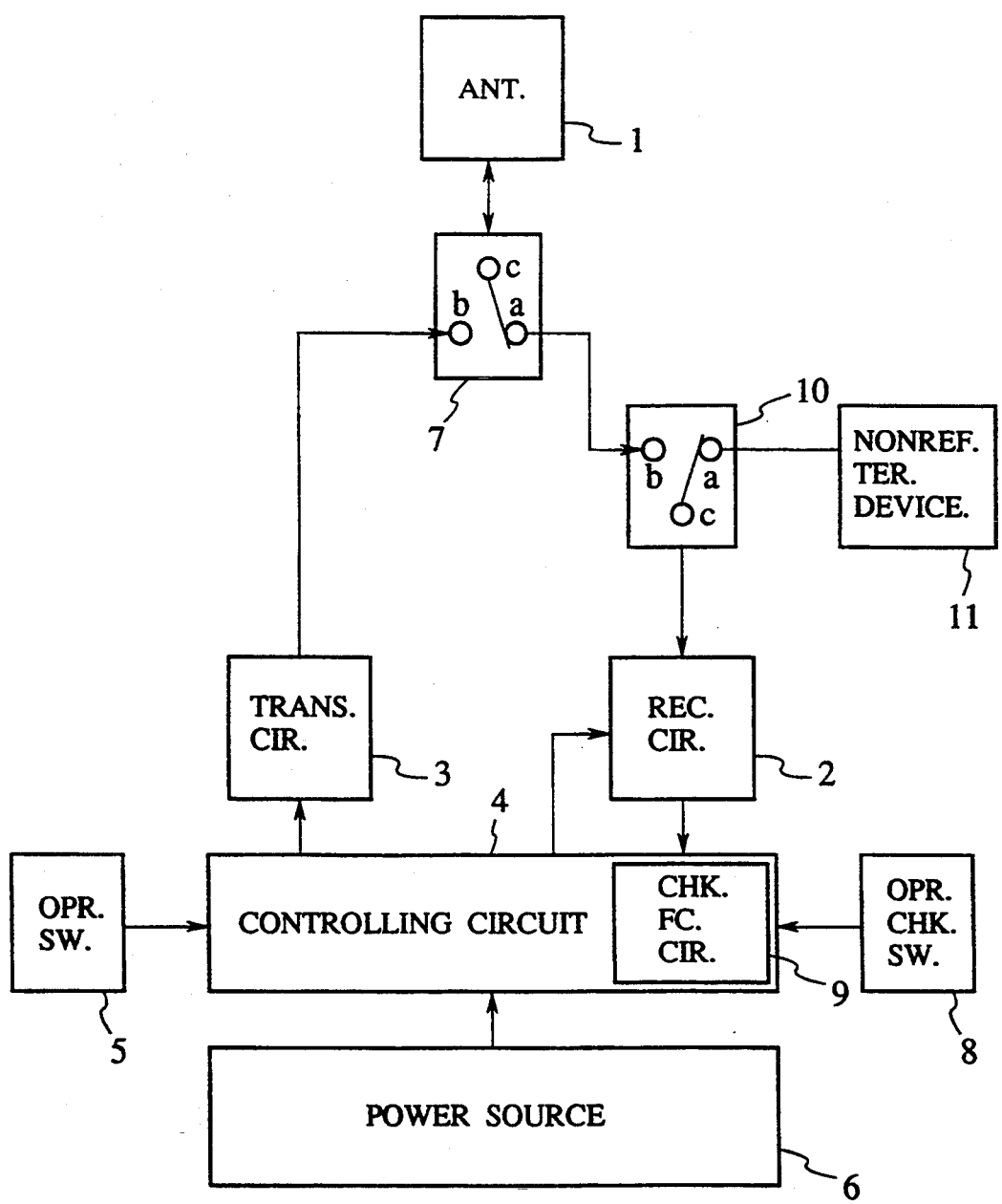
FIG. 7 is a block diagram showing the structure of the embodiment 2 of the SART of the present invention.

In case that the isolation between "b" and "a" contacts is insufficient, leaked electric power is large. Since the switch 7 and the receiving circuit 2 are connected directly, an input power level is large under the above case. Therefore, a check on the condition of near minimum-receiving level is impossible. When such a case seems likely, it can be effective to add a high-frequency switch 10. FIG. 7 is a block diagram showing the structure of the embodiment 2 of the present invention. In FIG. 7, the same construction elements of the embodiment 2 as those of the embodiment of FIG. 4 are referred to as the same reference numerals, and the description of them will be omitted. Reference numeral 10 designates a high-frequency changeover switch, one changeover contact "b" of which is connected to the changeover contact "a" of the changeover switch 7, and the other changeover contact "a" of which is connected to a non-reflecting terminating device 11, and further the common contact of which is connected to the input contact of the receiving circuit 2. The detailed structure of the controlling circuit 5 is as same as in FIG. 5.

Next, the operation of this embodiment will be described. When the operation-checking switch 8 is turned on, the changeover switch 10 is driven to the state in which the common contact "c" is connected to the side of the non-reflecting terminating device 11 by means of a changeover signal from the checking function circuit 9 which is inputted through the controlling circuit 4. In this state, since leaked electric power is inputted to the receiving circuit 2 through the leaking between the contacts "a" and "b" of the changeover switch 10 instead of being inputted directly to the receiving circuit 2, the transmission signal level inputted to the receiving circuit 2 is decreased to the level near to the actual operation levels, even if the isolation between the changeover contacts "a" and "b" of the changeover switch 7 is small, that is, the leaked electric power of transmission signals is large. For example, input level of the receiving circuit 2 becomes about 1:1000 of the level of switch 10. As a result, the operation-checking at the minimum receiving sensitivity level can be done.

Furthermore, it is thinkable that the amount of the isolation at the changeover switch 7 varies according to the variation of the load impedance of the antenna 1, but the amount of the variation is in a degree being able to be left out of consideration on the practical use plane.

EMBODIMENT 3

Figure 8:
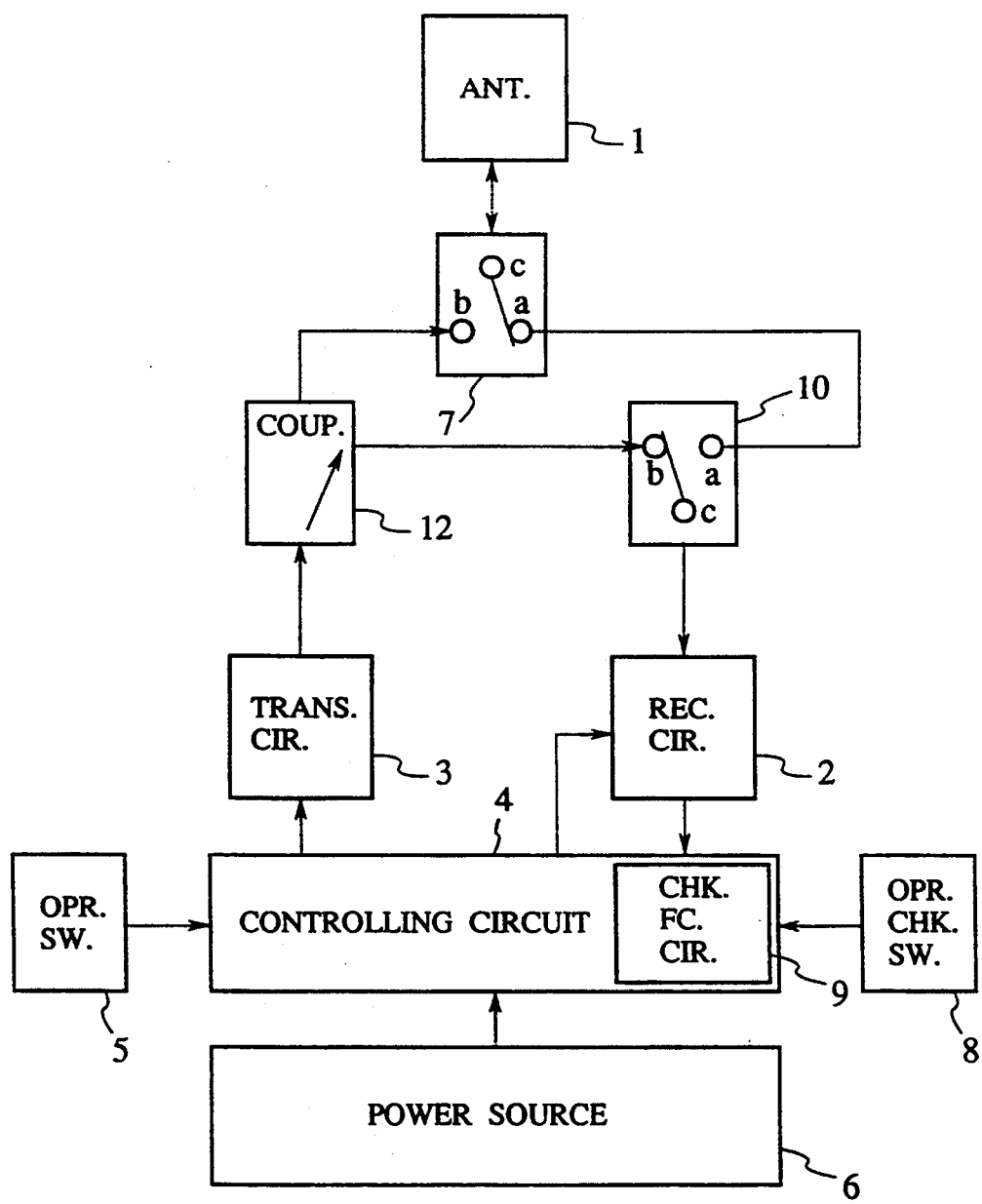
FIG. 8 is a block diagram showing the structure of the embodiment 3 of the SART of the present invention.

FIG. 8 is a block diagram showing the structure of the embodiment 3 of the present invention. In FIG. 8, the same construction elements of the embodiment 3 as those of the embodiment of FIG. 4 are referred to as the same reference numerals, and the description of them will be omitted. Reference numeral 12 designates a coupler equipped between the changeover switch 7 and the transmitting circuit 3 to supply a part of the transmission electric power of the transmitting circuit 3 to the receiving circuit 2 through the changeover switch 10. In this embodiment, the changeover contact "a" of the changeover switch 10, which is not connected to the coupler 12, is connected to the changeover contact "a" of the changeover switch 7. The detailed structure of the controlling circuit 5 is as same as in FIG. 5.

Next, the operation of this embodiment will be described. When the operation-checking switch 8 is turned on, changeover signals from the checking function circuit 9 are inputted to the changeover switch 7 and 10, and the changeover switch 7 is connected to the changeover contact "a" of the side of the receiving circuit 2, and further the changeover switch 10 is connected to the changeover contact "b" of the side of the coupler 12. Consequently, a transmission signal generated by the transmitting circuit 3 is inputted to the receiving circuit 2 through the coupler 12 and the changeover switch 10, then the controlling circuit 4 checks the operation of the SART. Since the changeover switch 7 is changed over to the side of its changeover contact "a" and the changeover switch 10 is changed over to the side of its changeover contact "b", it results in that the transmission signal is not impressed on the antenna 1 directly and the leaked electric power component of the transmission signal at the changeover switch 7 and 10 alone is impressed on the antenna 1. Consequently, there is no possibility that the transmission signal for operation-checking is transmitted to the outside from the antenna 1 and it is mistaken as a rescue signal. Besides, such checking parts as the coupler and the like are necessary in this embodiment, but this embodiment can be embodied without damaging the original performance of the SART, as these parts are very small in size and low in loss.

EMBODIMENT 4

Figure 9:
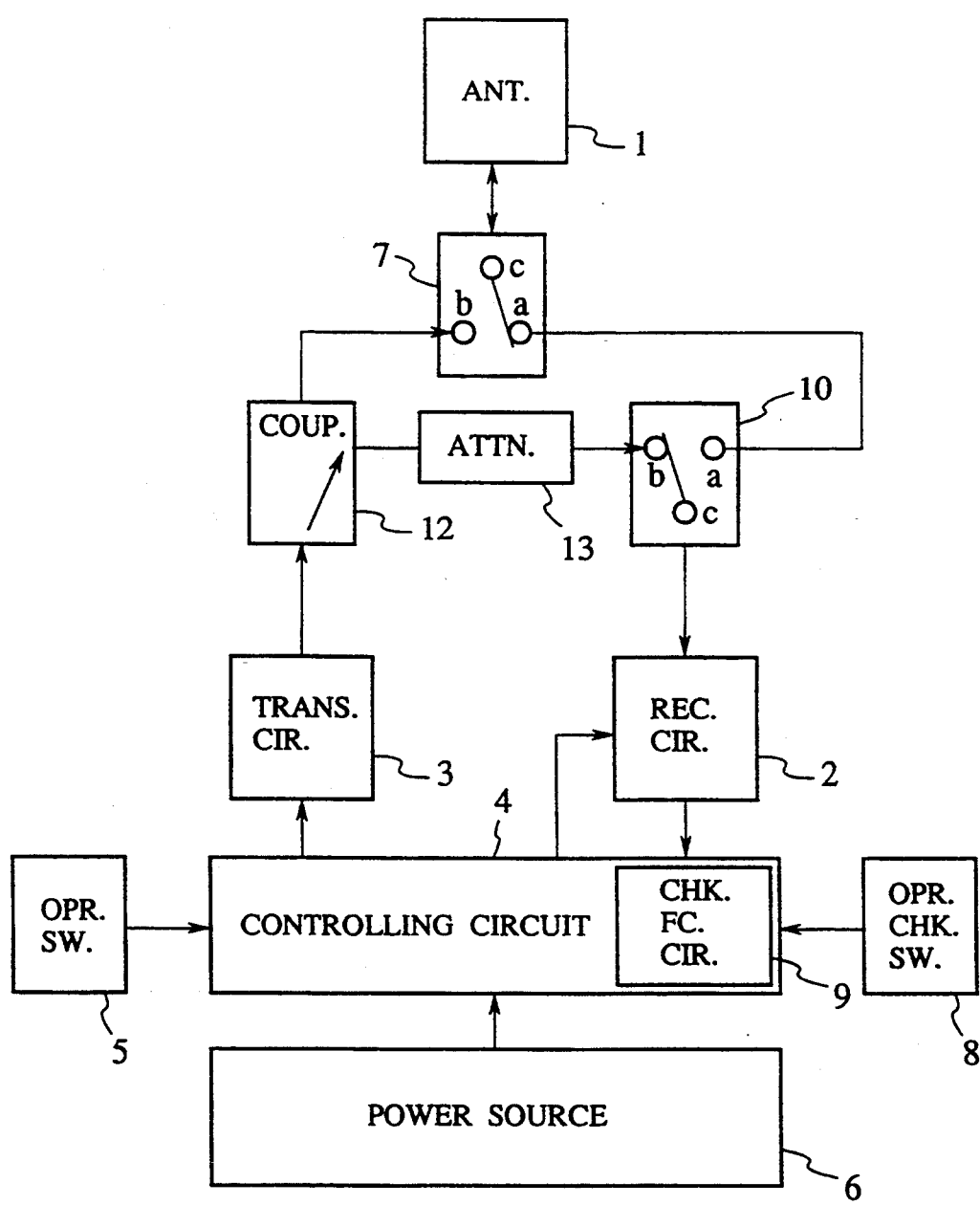
FIG. 9 is a block diagram showing the structure of the embodiment 4 of the SART of the present invention.

FIG. 9 is a block diagram showing the structure of the embodiment 4 of the present invention. In FIG. 9, the same construction elements of the embodiment 4 as those of the embodiment of FIG. 8 are referred to as the same reference numerals, and the description of them will be omitted. Reference numeral 13 designates an attenuator connected between the coupler 12 and the "b" contact of the changeover switch 10.

Next, the operation of this embodiment will be described. In this embodiment, the output signal level of the side of the receiving circuit 2 of the coupler 12 is attenuated to the optimum level for the operation of the receiving circuit 2 by means of the attenuator 13. Accordingly, close operation-checking is possible even if the output signal level of the side of the receiving circuit 2 of the coupler 12 is large.

EMBODIMENT 5

Figure 10:
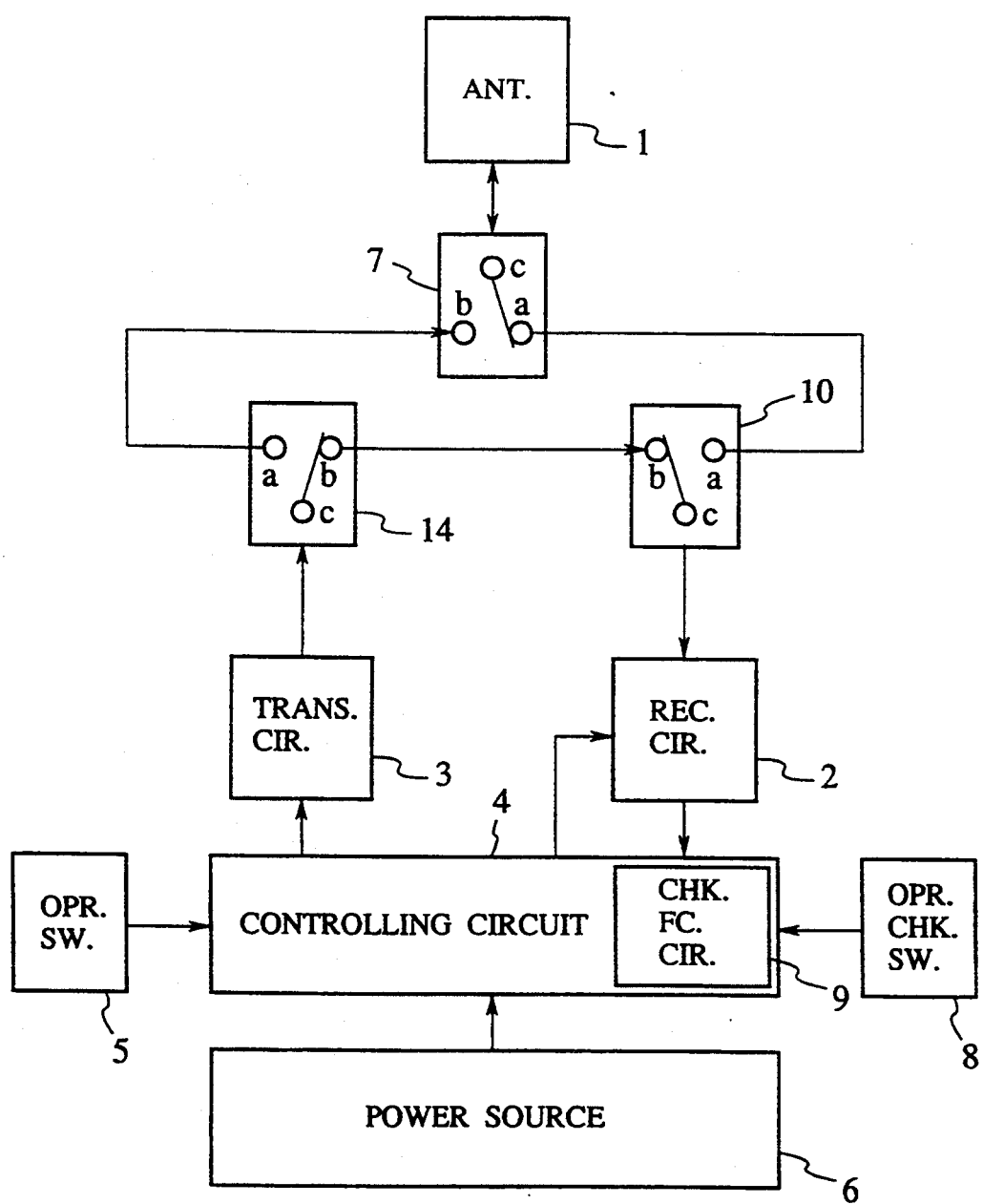
FIG. 10 is a block diagram showing the structure of the embodiment 5 of the SART of the present invention.

FIG. 10 is a block diagram showing the structure of the embodiment 5 of the present invention. In FIG. 10, the same construction elements of the embodiment 5 as those of the embodiment of FIG. 8 are referred to as the same reference numerals, and the description of them will be omitted. Reference numeral 14 designates a changeover switch equipped between the changeover switch 7 and the transmitting circuit 3 to change over the connection of the output contact of the transmitting circuit 3 between the side of the changeover switch 7 and the side of the changeover switch 10. That is to say, this embodiment is provided with the changeover switch 14 instead of the coupler 12 of the embodiment of FIG. 8.

Next, the operation of this embodiment will be described. When the operation-checking switch 8 is turned on, changeover signals from the checking function circuit 9 are inputted to the changeover switch 7, 10 and 14, and the changeover switch 7 is changed over to the changeover contact "a" of the side of the receiving circuit 2, and the changeover switch 10 is changed over to the changeover contact "b" of the side of the changeover switch 14, and further the changeover switch 14 is changed over to the changeover contact "b" of the side of the changeover switch 10. Consequently, a transmission signal generated by the transmitting circuit 3 is inputted to the receiving circuit 2 through the changeover switch 14 and the changeover switch 10, then the controlling circuit 4 checks the operation of the SART. Since the changeover switch 7 is changed over to the side of its changeover contact "a", the changeover switch 10 is changed over to the side of its changeover contact "b", and the changeover switch 14 is changed over to the side of its changeover contact "b" of the side of the changeover switch 10, it results in that the transmission signal is not impressed on the antenna 1 directly and the leaked electric power component of the transmission signal at the changeover switch 7, 10 and 14 alone is impressed on the antenna 1. Consequently, there is no possibility that the transmission signal for operation-checking is transmitted to the outside from the antenna 1 and it is mistaken as a rescue signal.

EMBODIMENT 6

Figure 11:
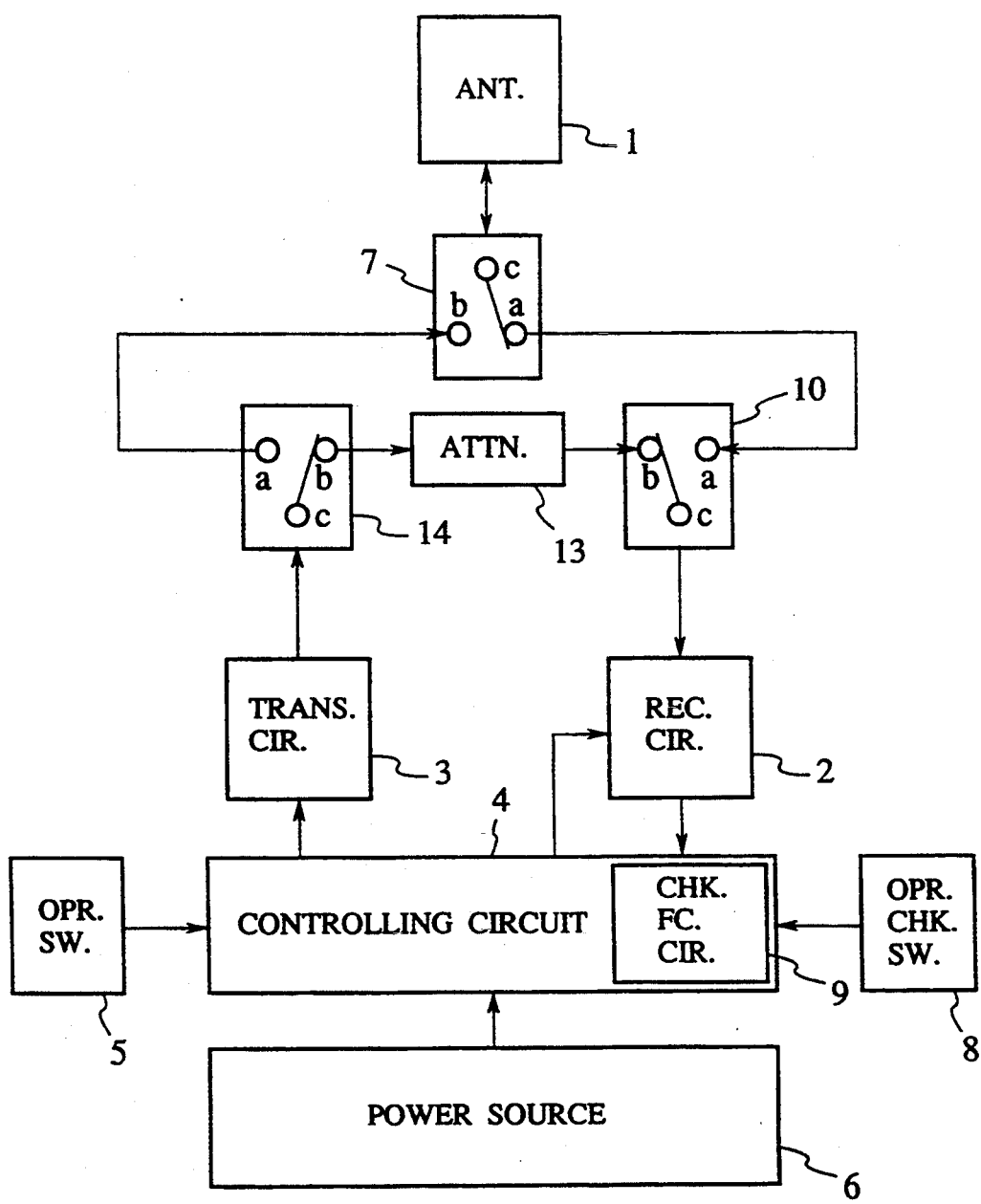
FIG. 11 is a block diagram showing the structure of the embodiment 6 of the SART of the present invention.

FIG. 11 is a block diagram showing the structure of the embodiment 6 of the present invention. In FIG. 11, the same construction elements of the embodiment 6 as those of the embodiment of FIG. 10 are referred to as the same reference numerals, and the description of them will be omitted. Reference numeral 13 designates an attenuator connected between the "b" contact of the changeover switch 14 and the "b" contact of the changeover switch 10.

Next, the operation of this embodiment will be described. In this embodiment, the output signal level of the transmitting circuit 3 is attenuated to the optimum level for the operation of the receiving circuit 2 by means of the attenuator 13. Accordingly, close operation-checking is brought to be possible even if the output signal level of the transmitting circuit 3 is large.

EMBODIMENT 7

Figure 12:
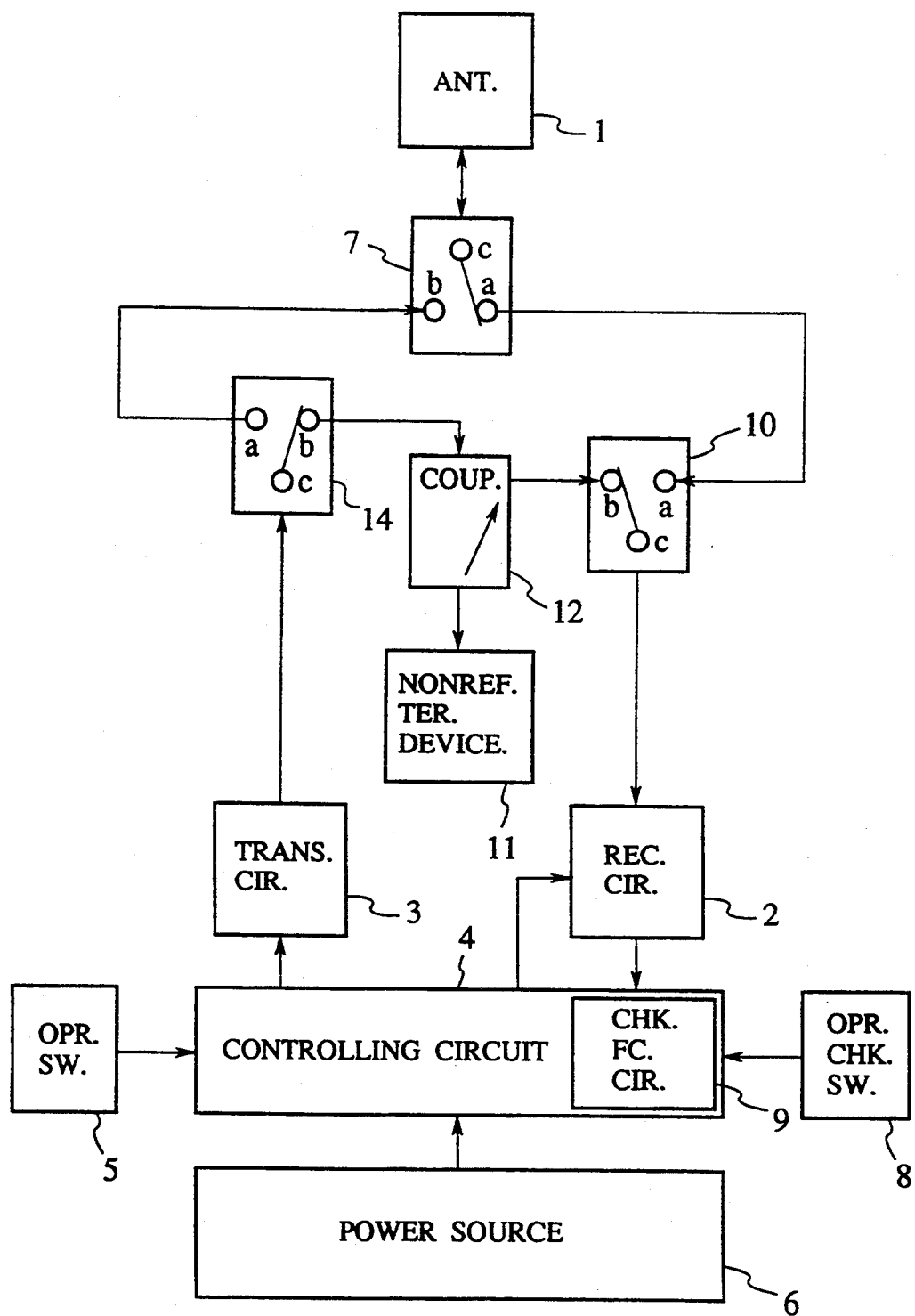
FIG. 12 is a block diagram showing the structure of the embodiment 7 of the SART of the present invention.

FIG. 12 is a block diagram showing the structure of the embodiment 7 of the present invention. In FIG. 12, the same construction elements of the embodiment 7 as those of the embodiment of FIG. 10 are referred to as the same reference numerals, and the description of them will be omitted. Reference numeral 12 designates a coupler connected between the changeover switch 10 and the changeover switch 14 to supply a part of the transmission electric power of the transmitting circuit 3 to the receiving circuit 2 and to supply the remaining transmission electric power to the non-reflecting terminating device 11.

Next, the operation of this embodiment will be described. A transmission signal transmitted from the transmitting circuit 3 at the time of the operation-checking of this embodiment is inputted to the coupler 12 through the changeover switch 14, and a part of the transmission signal is inputted to the receiving circuit 2 through the changeover switch 10, then the operation-checking is done. On the other hand, the other part of the transmission signal electric power is absorbed by the non-reflecting terminating device 11, so almost no signal is transmitted from the antenna 1. Moreover the coupling amount of the coupler 12 may be selected to be the optimum level of the operation of the receiving circuit 2.

It will be appreciated from the foregoing description that, according to the first aspect of the invention, a SART has an operation-checking apparatus within, the operation-checking apparatus making a transmitting circuit generate a transmission signal, the operation-checking apparatus making a receiving circuit receive the transmission electric power of the transmission signal having leaked at a changeover switch at the same time, the operation-checking apparatus judging the propriety of its operation by comparing the received signal level with a reference level. Consequently, the SART has such effects that it can check its operation without receiving radar signals, and that it can ascertain easily and rapidly whether its operation is normal or not at the time other than disasters, and that it can execute effective precaution checking.

Furthermore, according to the second aspect of the invention, a SART inputs leaked electric power to a receiving circuit, the leaked electric power having leaked at the second changeover switch in the leaked electric power at the first changeover switch changing over the connection of an antenna. Consequently, the SART has such an effect that it can be checked at signal levels near to its actual operating levels by decreasing input signal levels to the receiving circuit in the case where leaked electric power from the first changeover switch to the receiving circuit is large.

Furthermore, according to the third aspect of the invention, a SART inputs a part of transmission electric power to a receiving circuit through a coupler, and it changes over the first changeover switch to the side of the receiving circuit, and further it does not connect the second changeover switch to the side of the receiving circuit. Consequently, such an effect can be obtained that transmission signals are not radiated to the outside at the time of the operation-checking of the SART.

Furthermore, according to the fourth aspect of the invention, the third changeover switch changing over the output of a transmitting circuit is changed over to a receiving circuit side, and the receiving circuit side also is apart from an antenna of a SART by the second changeover switch. Consequently, such an effect can be obtained that transmission signals are not radiated to the outside at the time of operation-checking of the SART.

Furthermore, according to the fifth aspect of the invention, a non-reflecting terminating device absorbs transmission electric power. Consequently, such an effect can be obtained that transmission signals are not radiated to the outside at the time of operation-checking of a SART.

While preferred embodiments of the invention have been described using specific terms, such description is for illustrative purposes only, and it is to be understood that changes and variations may be made without departing from the spirit or scope of the following claims.

What is claimed is:

1. In a search and rescue radar transponder comprising an antenna receiving a radar signal and transmitting a rescue signal; a receiving circuit amplifying and detecting the radar signal received by said antenna; a transmitting circuit generating said rescue signal and outputting the rescue signal to said antenna; a changeover switch changing over the connection of said transmitting circuit and said receiving circuit to said antenna; and a controlling circuit controlling the operation of said transmitting circuit and said receiving circuit; the improvement which comprises an operation-checking switch changing over the operation of said search and rescue radar transponder to operation for checking; and a checking function circuit outputting a timing signal for generating said rescue signal to said transmitting circuit when said operation-checking switch is turned on, the checking function circuit outputting a changeover signal for changing over said changeover switch to said transmitting circuit side to the changeover switch, the checking function circuit outputting another timing signal for amplifying and detecting the leaked electric power of a transmission signal from said transmitting circuit which leaked at said changeover switch to said receiving circuit, the checking function circuit outputting an indicating signal for judging the propriety of operation by comparing an output signal level of said receiving circuit with a prescribed reference level to said controlling circuit.

2. The search and rescue radar transponder according to claim 1 further comprising a second changeover switch equipped between said changeover switch side and said receiving circuit side for changing over the connection to an input terminal of the receiving circuit between said changeover switch side and a non-reflecting terminating device side; and wherein said checking function circuit outputs a changeover signal to said second changeover switch when said operation-checking switch is turned on, the changeover signal changing over said second changeover switch to said non-reflecting terminating device side.

3. The search and rescue radar transponder according to claim 1 further comprising a coupler equipped between said changeover switch and said transmitting circuit for supplying a part of the transmission electric power of said transmitting circuit to said receiving circuit, and a second changeover switch equipped between said changeover switch and said receiving circuit for changing over the connection to an input terminal of the receiving circuit between said coupler side and said changeover switch side; and wherein said checking function circuit outputs a changeover signal for changing over said changeover switch to said receiving circuit side to the changeover switch when said operation-checking switch is turned on, and the checking function circuit outputs another changeover signal for changing over said second changeover switch to said coupler side to the second changeover switch.

4. The search and rescue radar transponder according to claim 1 further comprising a second changeover switch equipped between said changeover switch and said receiving circuit for changing over the connection to an input terminal of the receiving circuit between said transmitting circuit side and said changeover switch side; and a third changeover switch equipped between said changeover switch and said transmitting circuit for changing over the connection of an output terminal of the transmitting circuit between said changeover switch side and said receiving circuit side; and wherein said checking function circuit outputs a changeover signal for changing over said changeover switch to said receiving circuit side to the changeover switch when said operation-checking switch is turned on, and the checking function circuit outputs another changeover signal for changing over said second changeover switch to said transmitting circuit side to the second changeover switch, and further the checking function circuit outputs another changeover signal for changing over said third changeover switch to said receiving circuit side to the third changeover switch.

5. The search and rescue radar transponder according to claim 4 further comprising a coupler equipped between said second changeover switch and said third changeover switch for supplying a part of transmission electric power of said transmitting circuit to said receiving circuit and for supplying remaining transmission electric power to said non-reflecting terminating device.

* * * * *